No. 647,788. Patented Apr. 17, 1900.
J. C. ANDERSON.
CYCLE CAB.
(Application filed Aug. 19, 1899.)
(No Model.) 3 Sheets—Sheet 1.
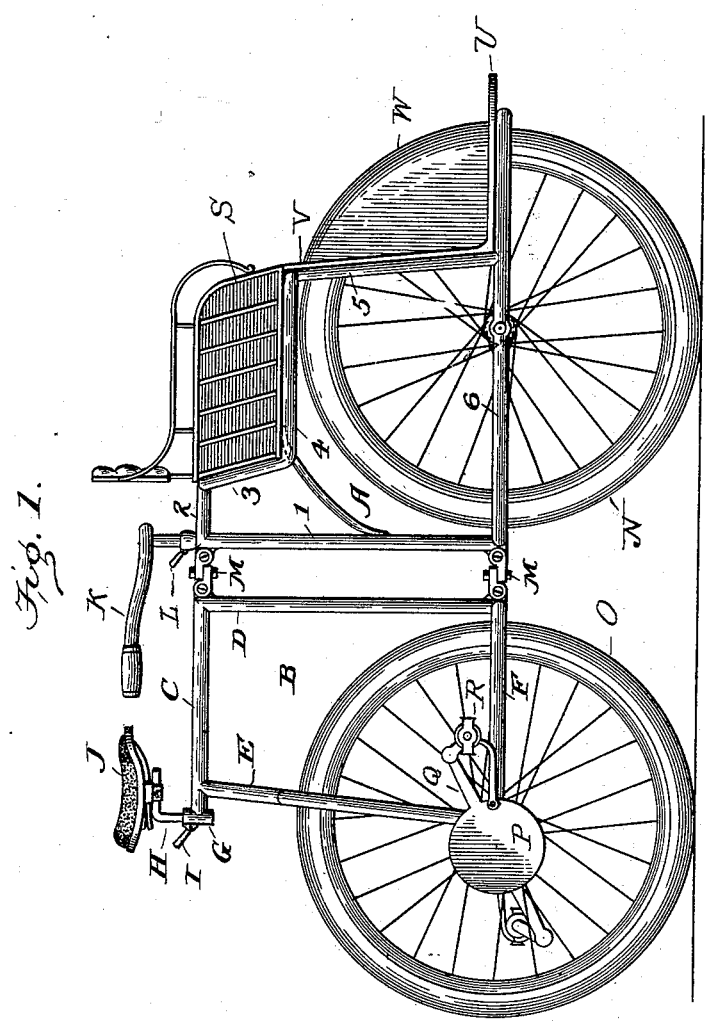
WITNESSES: Edwin L. Bradford, Jennie G. Booth.
INVENTOR Jas. C. Anderson
BY
ATTORNEY No. 647,788. Patented Apr. 17, 1900.
J. C. ANDERSON.
CYCLE CAB.
(Application filed Aug. 19, 1899.)
(No Model.) 3 Sheets—Sheet 2.
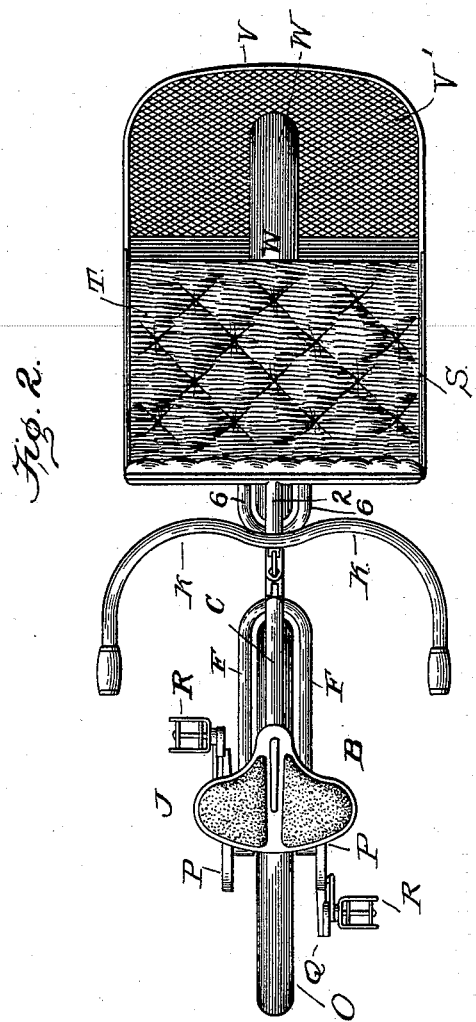
WITNESSES:
INVENTOR
BY
ATTORNEY No. 647,788. Patented Apr. 17, 1900.
J. C. ANDERSON.
CYCLE CAB.
(Application filed Aug. 19, 1899.)
(No Model.) 3 Sheets—Sheet 3.
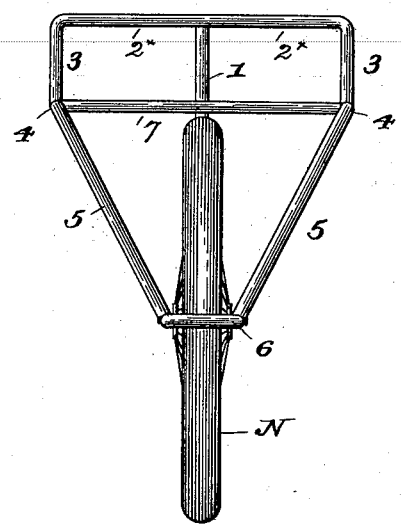
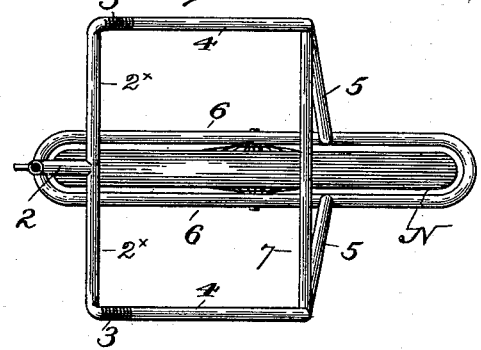
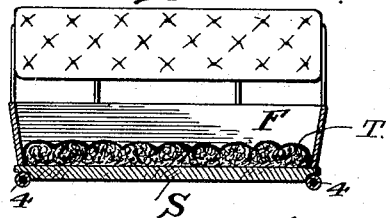
WITNESSES:
Edwin L. Bradford
Jennie G. Booth
INVENTOR
Jas. C. Anderson
BY
Wm C. McIntire
ATTORNEY

UNITED STATES PATENT OFFICE.

JAMES C. ANDERSON, OF HIGHLAND PARK, ILLINOIS.

CYCLE-CAB.

SPECIFICATION forming part of Letters Patent No. 647,788, dated April 17, 1900.

Application filed August 19, 1899. Serial No. 727,836. (No model.)

*To all whom it may concern:*

Be it known that I, JAMES C. ANDERSON, a citizen of the United States, residing at Highland Park, in the county of Lake and State of Illinois, have invented certain new and useful Improvements in Cycle-Cabs; and I do hereby declare the following to be a full, clear, and exact description of the invention, such as will enable others skilled in the art to which it appertains to make and use the same.

My invention relates to certain new and useful improvements in cycle construction, and has generically for its object the production of a two-wheel bicycle which by reason of its construction and adaptation I denominate a "cycle-cab."

My invention is designed both for pleasure and business and is differentiated from the ordinary bicycle by the fact that it is adapted to carry two persons through the physical effort of only one of such persons, thus rendering it useful in cities and towns for the purpose of conveying a passenger comfortably and economically to any locality expeditiously.

All bicycles as at present constructed are adapted to carry only one person, and such person constitutes the motive force for propelling the bicycle, and wherever the machine is adapted to carry more than one person each of such persons is required to lend physical force toward the propulsion of the machine and each is required to aid in maintaining the equilibrium of the machine. In a machine constructed according to my invention the person who exerts the physical force for propelling the machine also has sole control of its movements as to steering and equilibrium and also maintains the machine when at a state of rest in an upright position in order that the passenger may seat himself or alight from the machine in perfect safety.

In order that those skilled in the art may know how to make and use my improved cycle-cab, I will proceed to describe the same, referring by letters and numerals to the accompanying drawings, in which—

Figure 1 is a side elevation of one of my improved vehicles. Fig. 2 is a top or plan view of the same. Fig. 3 is a detail front view of the frame of the forward or cab section. Fig. 4 is a top or plan view of the frame of the cab-section with the seat removed, and Fig. 5 is a detail cross-section showing the manner of securing the seat in position.

Similar letters and numerals of reference denote like parts in the several figures of the drawings.

The vehicle is composed of two frames or sections. The forward section A is the cab-section and the rear B is the driver's section. The front frame A consists of a rear vertical tube 1, a short horizontal forwardly-projecting tube 2, which branches laterally, as shown at $2^\times$, (see Fig. 3,) and joins with vertically-oblique tubes 3, thence forwardly, as shown at 4, and thence downwardly in an oblique direction, as shown at 5, to a horizontal fork-frame 6, the rear end of which is connected with the lower end of the rear vertical tube 1. At the point of juncture or angle of the tubes 4 and 5 a horizontal bracing-tube 7 extends from one side to the other of the frame, and a similar cross-brace tube is located at the juncture or angle of 3 and 4. Thus a rectangular frame of suitable dimensions is provided to support a passenger-seat, hereinafter referred to.

The rear or driver's frame B is composed of an upper fork E and a horizontal fork F. The upper tube C extends rearward of the oblique fork E and is equipped with a hollow T-joint G to receive the saddle-post H, which latter is secured in position by a clamping-lever I. The saddle J is mounted upon the saddle-post in any suitable manner. K is the handle-bar, rigidly and adjustably secured within the rear tube 1 of the front or cab frame by a clamping-lever L.

The cab-frame A and driver's frame B are articulatively connected by joints M, having vertical and horizontal articulations and constructed as described in a pending application for improvement in multicycles filed by me on the 9th day of August, 1899, Serial No. 726,692.

N is the front or cab frame carrying wheel, which is mounted centrally upon ball-bearings in the horizontal fork 6, as clearly shown, and O is the rear driving-wheel, which is mounted in ball-bearings between the junctures of the vertical and horizontal forks E and F of the rear frame B and in the same vertical plane with the saddle J. It is driven by a gear P, cranks Q, and extension-pedals R, constructed and arranged as described in a pending application for bicycles for use in the military service filed by me on the 9th day of August 1899, Serial No. 726,694.

The handle-bars K when rigidly secured to the tube 1 of the cab-frame extend rearward toward and in proper relation to the saddle J on the rear frame to be grasped and manipulated by the driving rider, so that he may absolutely control the articulative movements of both the front and rear sections and also hold the front section or cab in steady vertical position while a passenger mounts or alights from the cab. Upon the upper rectangular seat-frame $2^\times$ 3 4 7 is mounted a comfortable seat S, made of any suitable light material and provided or not, as may be desired, with a cushion T. The under side of the edges of the bottom of the seat S is grooved to fit upon the tubes $2^\times$ 4 5 7, as clearly shown at Fig. 5, which not only secures the seat in position, but serves to strengthen and brace said tubes.

U is a light footboard which rests upon the forward end of the fork 6 and is secured by light tubes or angle-irons V to the front tube 7 of the seat-supporting frame. This footboard is preferably equipped with a thin roughed-surface rubber pad V' to give a sure footing to a passenger on mounting or alighting from the seat.

W is a shield or mud-guard resting upon the footboard U and secured in place, preferably to the footboard. A mud-guard 8 is arranged over the wheel N to protect the passenger riding over the same.

From the foregoing description it will be seen that the passenger occupying the cab-section sits directly over the front wheel, and the latter is devoid of any driving mechanism, and that by reason of the articulate connection between the cab-section in front and the driver's section in the rear, and the location and relation of the handle-bars K and the saddle J, the driver occupying the saddle controls the entire and every movement of the forward or cab section and that in doing so he involuntarily controls also the rear section. As the driver necessarily grasps the handle-bars before mounting the saddle J, a passenger may safely step upon the footboard and seat himself comfortably upon the the seat without fear of toppling the machine over, and likewise when the driver dismounts he naturally retains his hold upon the handles, and hence the passenger may alight with equal ease and safety.

In the peculiar arrangement of the articulative joints between the cab-section and the rear or driver's section I secure in a two-wheel vehicle not only the lateral pivotal movement, but I also relieve both riders from the double momentum shock which would necessarily be felt by each were the two frames devoid of vertical articulation, and while this generic principle is described in my pending application for multicycle hereinbefore referred to it is especially desirable in my present vehicle, because it avoids all tendency toward throwing the riding passenger forward and gives him great confidence in the security of his seat.

I have hereinbefore designated the rear section as the "driver's" section, and mean by this designation to indicate that this section is occupied by the person who propels and steers the machine and that he is in the discharge of his functions analogous to the driver of an ordinary cab, while the person occupying the front seat is merely a passenger in charge of the driver.

What I claim as new, and desire to secure by Letters Patent, is—

1. A cycle-cab consisting of a frame mounted centrally upon a single carrying-wheel and provided with a passenger-seat directly over the wheel, and with a rigid handle-bar in rear of the seat, and also with rearwardly-projecting lugs in the same vertical plane and adapted to be articulatively connected with a trailing frame mounted upon a driving-wheel and provided with a saddle, whereby the cab-frame may be propelled, substantially as hereinbefore set forth.

2. A cycle-cab consisting of a forward frame mounted centrally upon a single carrying-wheel, and provided with a passenger-seat over the wheel, and also with a rigid handle-bar extending rearwardly from the frame, a rear or trailing frame mounted vibratively at its rear end upon a driving-wheel connected with suitable driving mechanism, and a saddle arranged directly over the axis of the wheel and in rear of the handle-bar of the cab-frame and articulative connections between the forward and the trailing frames, substantially as and for the purposes set forth.

3. The forward cab composed of a rear vertical tube 1, forwardly-projecting tubes 2, lateral branch tubes $2^\times$, oblique vertical tubes 3, horizontal tubes 4, vertical oblique tubes 5, horizontal fork-tube 6, and bracing cross-tubes 7, all rigidly secured together at the respective points of juncture to constitute a unitary frame; a rigid handle-bar K and seat S secured to the frame, a single carrying-wheel mounted in the fork-tube 6 of the frame and means for articulatively connecting the cab to a trailing and propelling frame or cycle, substantially as described.

4. In combination with the frame A, mounted centrally upon a single carrying-wheel and provided with a seat over said wheel and a footboard each side of the wheel, a shield or mud-guard W, inclosing the upper forward quadrant of the wheel, substantially as and for the purposes set forth.

In testimony whereof I affix my signature in presence of two witnesses.

JAMES C. ANDERSON.

Witnesses:
JENNIE G. BOOTH,
DANL. W. BONN.